(12) United States Patent
Wu (10) Patent No.: US 9,727,655 B2
(45) Date of Patent: Aug. 8, 2017

(54) SEARCHING SYSTEM, METHOD AND P2P DEVICE FOR P2P DEVICE COMMUNITY (71) Applicants: ThroughTek Technology (ShenZhen) Co., Ltd., Shenzhen (CN); ThroughTek Co., Ltd., Taipei (TW)

(72) Inventor: Hsin-Tai Wu, Taipei (TW)

(73) Assignees: THROUGHTEK TECHNOLOGY (SHENZHEN) CO., LTD., Shenzhen (CN); THROUGHTEK CO., LTD., Taipei (TW)

(*) Notice: Subject to any disclaimer, the term of this patent is extended or adjusted under 35 U.S.C. 154(b) by 322 days.

(21) Appl. No.: 14/616,478

(22) Filed: Feb. 6, 2015

(65) Prior Publication Data

US 2016/0098486 A1 Apr. 7, 2016

(30) Foreign Application Priority Data

Oct. 3, 2014 (TW) .............................. 103134585 A (51) Int. Cl.
G06F 17/30 (2006.01)
H04L 29/08 (2006.01)

(52) U.S. Cl.
CPC .. *G06F 17/30867* (2013.01); *G06F 17/30424* (2013.01); *H04L 67/104* (2013.01)

(58) Field of Classification Search
None
See application file for complete search history.

(56) References Cited

U.S. PATENT DOCUMENTS

| 2012/0123924 | A1* | 5/2012 | Rose ...................... G06Q 20/12 705/35 |
| 2012/0197911 | A1* | 8/2012 | Banka ............... G06F 17/30864 707/752 |
| 2013/0080565 | A1* | 3/2013 | van Coppenolle .... G06Q 30/06 709/213 |
| 2013/0166332 | A1* | 6/2013 | Hammad ............... G06Q 40/10 705/5 |
| 2013/0273968 | A1* | 10/2013 | Rhoads ............. G06F 17/30244 455/556.1 |
| 2014/0019352 | A1* | 1/2014 | Shrivastava ....... G06Q 20/3674 705/41 |
| 2014/0164507 | A1* | 6/2014 | Tesch ...................... H04L 51/10 709/204 |
| 2014/0282586 | A1* | 9/2014 | Shear .................... G06F 9/5072 718/104 |
| 2014/0337175 | A1* | 11/2014 | Katzin ................. G06Q 20/204 705/26.62 |
| 2015/0149286 | A1* | 5/2015 | Brown, II .......... G06Q 30/0264 705/14.58 |

* cited by examiner

*Primary Examiner* — Wilson Lee
(74) *Attorney, Agent, or Firm* — Chun-Ming Shih (57) ABSTRACT

A searching system, searching method and P2P devices for a P2P device community are provided. An online server connects to a content management server and a P2P device community, respectively. The content management server includes a search engine and an index database, and each of the P2P devices of the P2P device community is provided with an indexed data and a weighted data. The index database is recorded with the indexed data associated with each of the P2P devices of the P2P device community, and the search engine searches the index database to generate a search result and then generates a weighted and sorted search result based on the weighted data, thereby achieving the object of searching important file data in the P2P device community.

19 Claims, 8 Drawing Sheets

SEARCHING SYSTEM, METHOD AND P2P DEVICE FOR P2P DEVICE COMMUNITY

CROSS-REFERENCE TO RELATED APPLICATIONS

This non-provisional application claims priority claim under 35 U.S.C. §119(a) on Taiwan Patent Application No. 103134585 filed Oct. 3, 2014, the entire contents of which are incorporated herein by reference.

BACKGROUND

Technical Field

The present disclosure relates to a searching system, searching method, and devices and, more particularly, to a searching system, searching method, and P2P devices for a P2P device community.

Description of Related Art

A central server functioning as a storage, provider, exchanging, or searching of data is desirable for conventional network data and multimedia storage systems. The central server, however, has a fixed processing performance and storage capacity and therefore is not adapted to fit into various requirements, either causing the systems to perform low in network transmission or leading to excess resources.

Figure 1:
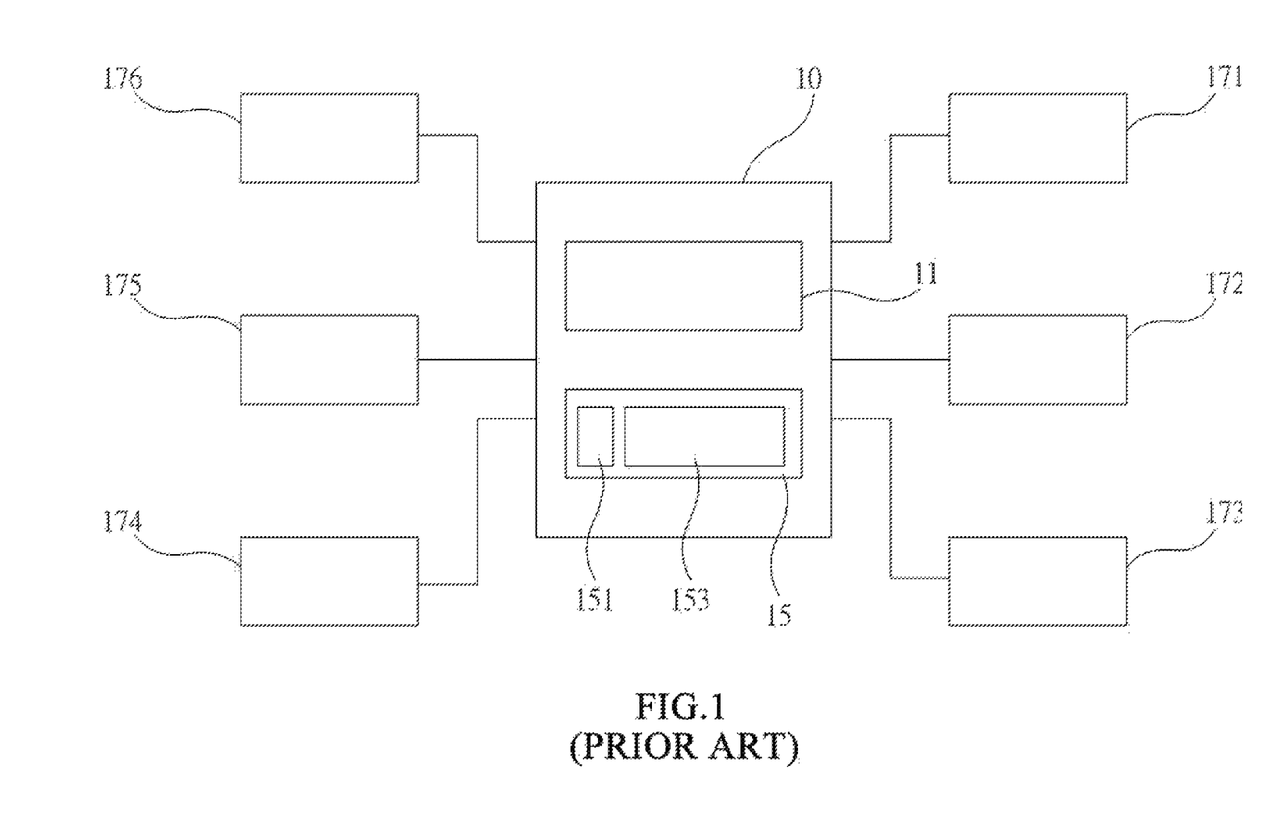
FIG. 1 is a schematic view of a searching system for network devices in prior arts.

Referring to FIG. 1 there is shown a schematic view of a searching system for network devices in prior arts. The centralized network system includes a central server 10 provided with a file data 15, and the file data includes an indexed data 151 and a content data 153. When any one of the user's devices 171, 172, 173, 174, 175, and 176 requests data, the user's device communicates with the central server 10 so as to download or upload the file data 15 stored therein.

The central server 10 is provided with a search engine 11, and the search engine 11 creates the indexed data 151 corresponding to the content data 153. When users request to search the content data 153, the user's devices 171~176 request a search request to the central server 10, and the search engine 11 of the central server 10 searches the indexed data 151 based on the search criteria requested by the user's devices 171~176 and generates a search result. The search result is then returned to the user's devices 171~176 by the central server 10.

A P2P (peer to peer) device community has been employed to solve the limitation on the utilization of resources and performance for the central server 10 in prior arts. It is desirable that the data searching in the P2P device community should be further improved, for example, such as increasing searching efficiency and speed while effectively improving searching accuracy.

SUMMARY

An object of the present disclosure is to provide a novel data searching system and searching method for a P2P device community so as to effectively increase the efficiency and speed of data searching.

To achieve the aforementioned object, the present disclosure provides a searching system for a P2P device community. The searching system receives a search request sent from at least one user's device and includes: at least one P2P device community, each of the P2P device communities includes at least one P2P device; at least one online server connecting to the P2P device community, each of the online servers includes a topology data table, the topology data table being recorded with a link data of between each of the P2P devices of the P2P device community; and at least one content management server connecting to the P2P device community and the online server, respectively, each of the content management servers includes a search engine, an index database, and a user's device management unit, the index database being recorded with an indexed data of each of the P2P devices of the P2P device community, the user's device management unit receiving the search request requested by a user's device, the search engine searching the index database to generate a search result based on the search request and returning the search result to the user's device.

To achieve the aforementioned object, the present disclosure further provides a searching method for a P2P device community. The searching method is applicable to a searching system for a P2P device community, in which the searching system includes at least one P2P device, an online server, and a content management server, and the searching method includes the steps of: recording a link data of each of the P2P devices to generate a topology data table and storing the topology data table in the online server; creating an indexed data of each of the P2P devices and storing the indexed data in an index database of the content management server; receiving by the content management server a search request sent from a user's device and generating a search result by searching the index database based on the search request; and returning the search result to the user's device.

In one embodiment of this disclosure, each of the P2P devices includes a weighted data, and the content management server is provided with a sorting algorithm module creating the weighted data based on the link data associated with the P2P devices, the search result being sorted by the order of the weighted data of the P2P devices so as to generate a sorted search result.

In one embodiment of this disclosure, the searching system further includes a weight look-up table recorded with the weighted data of each of the P2P devices, in which the weight look-up table may be stored in the content management server, the online server, or a storage device.

In one embodiment of this disclosure, the sorting algorithm module performs a function operation based on the search result and the weighted data corresponding to the P2P devices to generate a weighted search result, and the weighted search result is sorted by the order of the weighted search results so as to generate a weighted and sorted search result.

In one embodiment of this disclosure, the user's device management unit includes a user-charge module. Upon confirming that the user's device has been charged, the content management server provides the search result, or the online server provides at least one of the link data of the P2P devices, to the user's device.

In one embodiment of this disclosure, the user-charge module receives a user's identity data, a pricing data, a charging-mode data, or a payment confirmation data, all of which are sent from the user's device.

In one embodiment of this disclosure, the indexed data can be created by the P2P devices themselves, or the indexed data can be created by the content management server gathering from the P2P devices via a network gathering module.

In one embodiment of this disclosure, each of the P2P devices includes at least one file data. When the user's device selects the P2P device to be connected based on the search result, the online server provides the link data of the P2P device, and the user's device connects to the selected P2P device based on the link data and downloads the file data.

In one embodiment of this disclosure, the user's device selects the P2P device to be connected based on the search result, and the online server provides the link data of the P2P device, so as for the user's device to connect to the selected P2P device based on the link data.

In one embodiment of this disclosure, the P2P device includes: at least one file data, each of the file data includes an indexed data; and a control unit controlling the file data being an open state or a hidden state.

In one embodiment of this disclosure, the searching method further includes the steps of: the content management server creating a weighted data associated with each of the P2P devices based on the link data of the P2P devices; performing a function operation based on the search result and the weighted data corresponding to the P2P devices to generate a weighted search result; and sorting the weighted search result based on the order of the weighted search results to generate a weighed and sorted search result.

In one embodiment of this disclosure, the searching method further includes the steps of: recording the weighted data of the P2P devices to generate a weight look-up table; and storing the weight look-up table in the content management server, the online server, or a storage device.

In one embodiment of this disclosure, the searching method further includes the steps of: providing the search result by the content management server, or providing at least one link data of the P2P devices by the online server, to the user's device after the content management server confirming that the user's device has been charged.

In one embodiment of this disclosure, the confirmation of payment from the user's device by the user-charge module includes the steps of: confirming a user's identity data of the user's device; receiving a charge-mode data sent from the user's device; confirming a payment confirmation data sent from the user's device; and recording a pricing data required for connection or downloading requested by the user's device.

In one embodiment of this disclosure, the searching method further includes the step of: controlling a file data of each of the P2P devices being an open state or a hidden state.

In one embodiment of this disclosure, the searching method further includes the steps of: selecting the P2P device to be connected by the user's device based on the search result; providing the link data of the P2P device to the user's device by the online server; and connecting to the selected P2P device and downloading the file data by the user's device based on the link data.

In one embodiment of this disclosure, the searching method further includes the steps of: selecting the P2P device to be connected by the user's device based on the search result; providing the link data of the P2P device to the user's device by the online server; and connecting to the selected P2P device by the user's device based on the link data.

BRIEF DESCRIPTION OF THE DRAWING

An illustrative embodiment of the present disclosure will be further discussed with reference to the accompanying drawing, in which.

DETAILED DESCRIPTION OF THE PREFERRED EMBODIMENTS

In order to further understand the present disclosure, preferred embodiments are to be described such that variations and alterations thereto are readily apparent to a person skilled in the art. However, it will be realized that the scope of this disclosure is not confined or restricted to the details of the embodiments described below. Identical reference numerals always designate the same elements throughout all the figures of the drawing.

Figure 2:
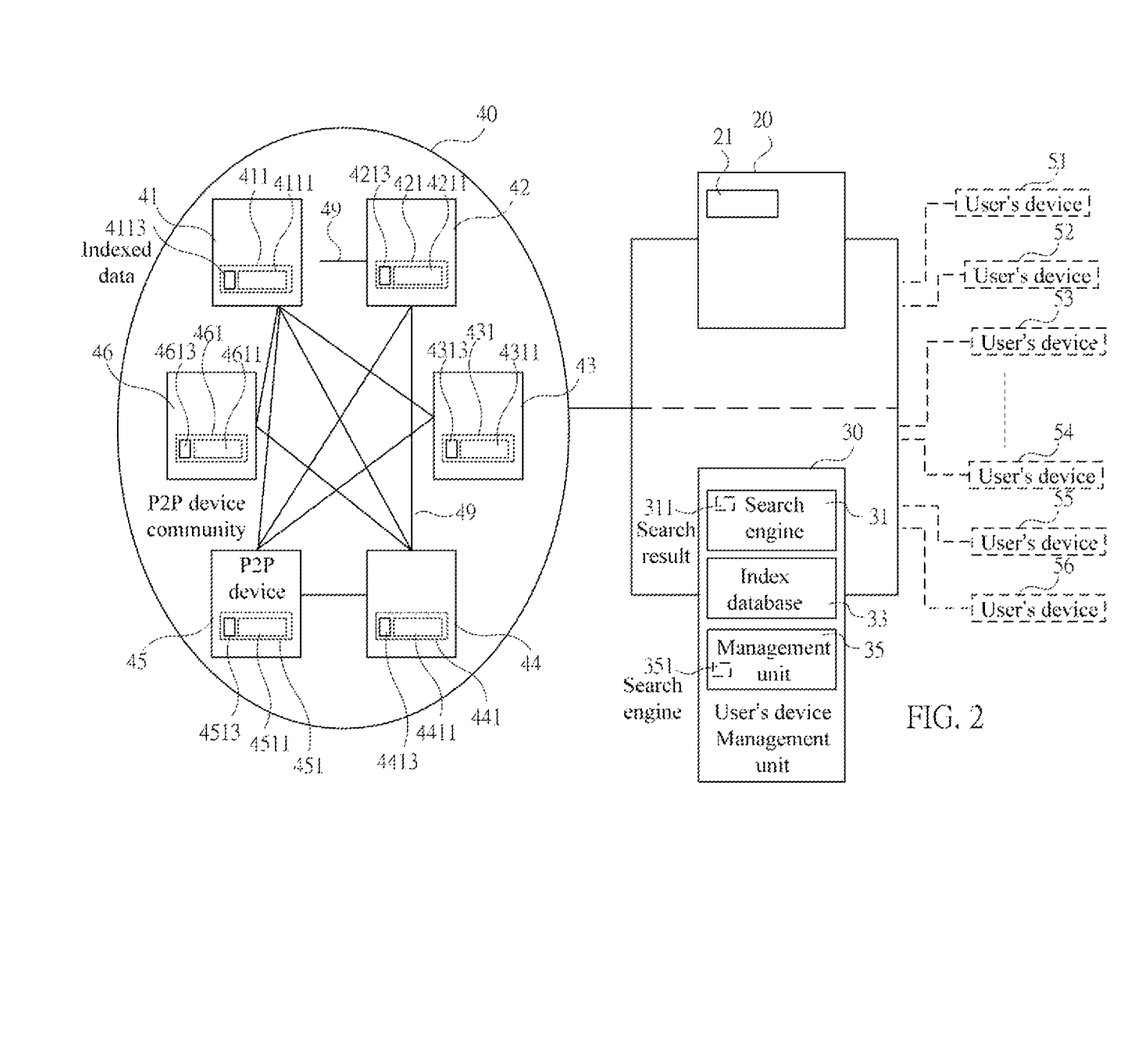
FIG. 2 is a schematic view of a searching system for a P2P device community and the P2P devices in accordance with an embodiment of the present disclosure.

First, referring to FIG. 2 there is shown a schematic view of a searching system for a P2P device community and the P2P devices in accordance with an embodiment of the present disclosure. As shown, the searching system of the P2P device community includes: a P2P device community 40, an online server 20, and a content management server 30. The online server 20 connects to the content management server 30 and the P2P device community 40, respectively, and the content management server 30 also connects to the P2P device community 40 and the online server 20, respectively. There exist multiple P2P devices 41, 42, 43, 44, 45, 46 within the P2P device community 40. The online server 20 is provided with a topology data table 21. The content management server 30 is provided with a search engine 31, an index database 33, and a user's device management unit 35.

The topology data table 21 of the online server 20 is mainly recorded with a link data 49 between each of the P2P devices 41~46 within the P2P device community. The link data 49 refers to the connection relationship between the P2P devices 41~46, which includes, but is not limited to, the connection structure, connection data and/or locations of connection.

The index database 33 of the content management server 30 records and manages all the indexed data 4113, 4213, 4313, 4413, 4513, and 4613 of the P2P devices 41~46 within the P2P device community 40. The indexed data 4113~4613 can be provided to the content management server 30 voluntarily by the P2P devices 41~46, or the indexed data 4113~4613 can be obtained by the content management server 30 gathering from the P2P devices 41~46 via a network gathering module (e.g., a network crawler), and recording them in the index database 33.

The searching system for the P2P device community 40 of this disclosure can receive a search request 351 requested and sent from one or more user's devices 51, 52, 53, 54, 55, and 56. The user's device management unit 35 records and manages the user's devices 51~56 (or referred to as each user). When a user requests a data search, the user can use the user's device 51, 52, 53, 54, 55, or 56 to connect to the user's device management unit 35 of the content management server 30 and/or the online server 20, and request the search request 351 to the user's device management unit 35 of the content management server 30 (as shown in dashed lines). The search engine 31 of the content management server 30 then search the index database 33 based on the search request 351 so as to generate a search result 311. The search result 311 is returned to the user's devices 51, 52, 53, 54, 55, and 56 who requested the search request 351. Based on the search result 311, the user's devices 51~56 can obtain the link data 49 or locations of the connection of the P2P devices 41~46 within the P2P device community 40 via the topology data table 21 of the online server 20, and select from the P2P devices 41, 42, 43, 44, 45, and/or 46 the device to communicate with and to obtain data from there.

In one embodiment, each of the P2P devices 41~46 is respectively provided with at least one file data 411, 421, 431, 441, 451, or 461, and each of the file data 411~461 further includes a content data 4111, 4211, 4311, 4411, 4511, 4611 and/or an indexed data 4113, 4213, 4313, 4413, 4513, 4613. The file data 411-461 stored in the P2P devices 41-46 may be at least, but not limited to, one picture, video, music, journal paper and/or statistic data. The user's devices 51~56 can, after connecting to the P2P devices 41~46 selected, link or download the file data 411~461 selected, thereby achieving the object to fast search important data (i.e., file data 411~461) within the P2P device community 40.

The user's devices 51~56 may be but not limited to a smartphone, a tablet PC, a portable electronic and/or a computer system.

Figure 3:
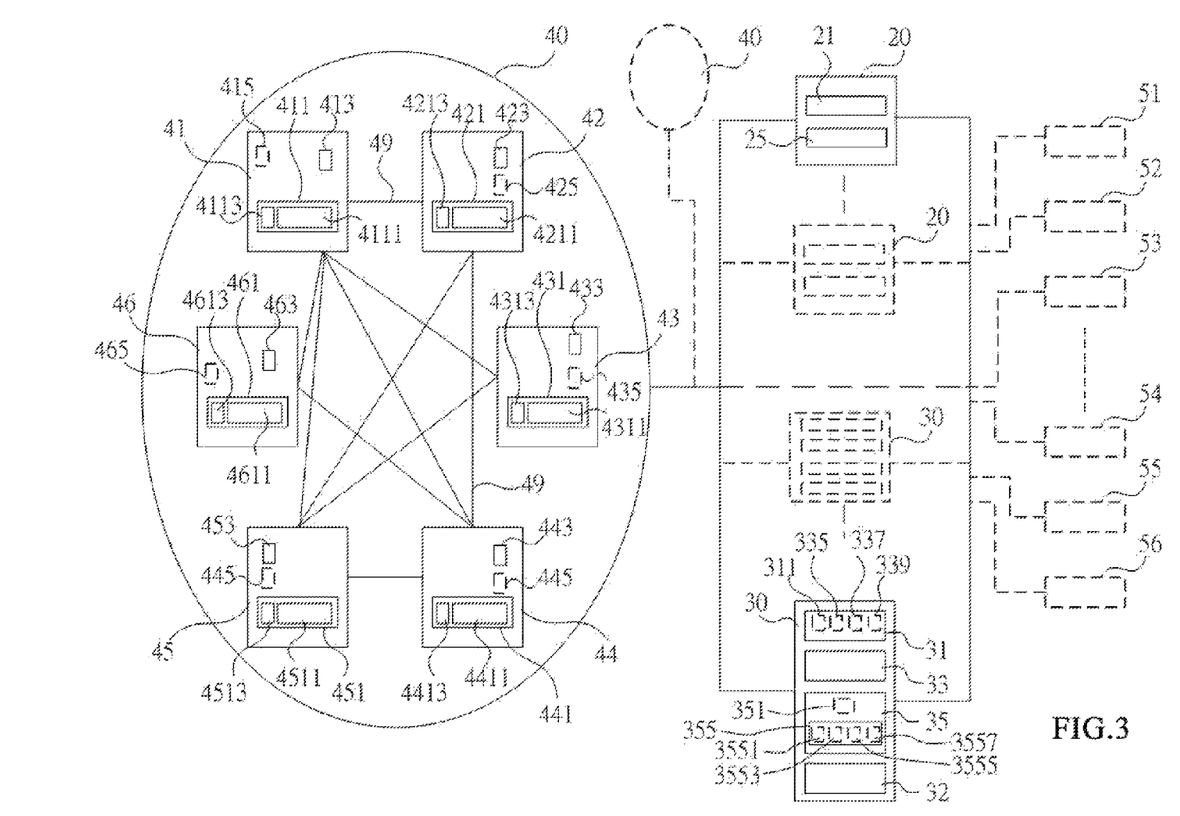
FIG. 3 is a schematic view of a searching system for a P2P device community and the P2P devices in accordance with another embodiment of the present disclosure.

Further, referring to FIG. 3 there is shown a schematic view of a searching system for a P2P device community and the P2P devices in accordance with another embodiment of the present disclosure. The difference from the embodiment shown in FIG. 2 lies in: each of the P2P devices 41~46 in FIG. 3 is respectively provided with a weighted data 413, 423, 433, 443, 453, and 463, and the content management server 30 is further provided with a sorting algorithm module 32, in which the sorting algorithm module 32 creates the weighted data 413, 423, 433, 443, 453, and 463 of the respective P2P devices 41~46 based on the link data 49 of the P2P devices 41, 42, 43, 44, 45, and 46.

When a user needs to perform data searching, the user may request a search request 351 to the user's device management unit 35 of the content management server 30 via the user's device 51, 52, 53, 54, 55 or 56. The search engine 31 of the content management server 30 searches each of the indexed data 4113, 4213, 4313, 4413, 4513, and 4613 within the P2P device community 40 through the topology data table 21 of the online server 20, or the search engine 31 directly searches the index database 33 based on the search criterion of the search request 351 so as to generate a search result 311. The sorting algorithm module 32 sorts the search result 311 by the order of the weighted data 413, 423, 433, 443, 453, and 463 of the P2P devices 41~46 so as for the search engine 31 to further generate a sorted search result 335, as shown in dashed lines. The sorted search result 335 is returned to the user's device 51, 52, 53, 54, 55, or 56 who requested the search request 351 via the user's device management unit 35, providing the user's devices 51~56 to select the requested file data 411~461, the content data 4111~4611 and/or the P2P device 41~46 to be connected, thereby achieving the object of fast searching for the most important data within the P2P device community 40.

In the embodiments of the present disclosure, the order of the weighed data 413~463 is used to sort the search result 311; however, it should not be construed as a limitation. Other criteria which provide comparison, for example, the search speed, may be used to sort the search result 311.

In one embodiment, the online server 20 or the content management server 30 may be provided with a weight look-up table 25, in which the weight look-up table 25 is recorded with the weighted data 413, 423, 433, 443, 453, 463 corresponding to each of the P2P devices 41, 42, 43, 44, 45, 46.

Further, in one embodiment, when the user and/or the user's device 51, 52, 53, 54, 55, or 56 requests a search request 351 to the user's device management unit 35 of the content management server 30, the search engine 31 of the content management server 30 can search each of the indexed data 4113, 4213, 4313, 4413, 4513 and 4613 within the P2P device community 40 based on the topology data table 21 of the online server 20. Since each of the P2P devices 41~46 may include one or more file data 411~461, or each of the indexed data 4113~4613 may include one or more content data 4111~4611 represented thereto, each of the indexed data 4113~4613 may generate one or more search results 311. A function operation is performed on the weighted data 413, 423, 433, 443, 453, and 463 corresponding to the P2P devices 41~46, a weighted search result 337, which represents the order of each of the search results 311, is generated. A sorting operation is performed on all the weighted search results 337 by the order of the weighted search results 337 and a weighted and sorted search result 339 is generated. The weighted and sorted search result 339 is then returned to the user's device 51~56 who requested the search request 351 via the user's device management unit 35, thereby achieving the object of fast searching for the most important data within the P2P device community 40.

In one embodiment, the above-mentioned function operation may be, but is not limited to, for example, a multiplication, an addition, a geometric progression, a PageRank, an HITS and/or a TrustRank, which can be performed to generate the weighted and sorted search result 339 representing each of the search results 311.

In one embodiment, the index database 33 may be used to record and store the indexed data 4113~4613 of the P2P devices 41~46, in which the indexed data 4113~4613 may include, but not limited to, at least one metadata, at least one tag, at least one XML, at least one RSS, at least one database and/or at least one webpage.

In one embodiment, the user's device management unit 35 may be provided a user-charge module 355. After the user's devices 51~56 have made the payment process to the user's device management unit 35 of the content management server 30 and the process is confirmed, the content management server 30 is allowed to provide the search result 311, the sorted search result 335, the weighted search result 337, the weighted and sorted search result 339 and/or the online server 20 is allowed to provide the link data 49 of the P2P devices 41~46 to the user's devices 51~56.

In one embodiment, the indexed data 4113~4613 can be created by the search engine 31 based on the content data 4111~4611 of the P2P devices 41~46, or the indexed data 4113~4613 can be created by the P2P devices 41~46 themselves and the P2P devices 41~46 then voluntarily provide the indexed data to the content management server 30 for recording. Alternatively, the content management server 30 utilizes a network gathering module, for example, a network crawler, to gather data from the P2P devices 41~46 and record the data in the index database 33.

In one embodiment, there may be one or more online servers 20, content management servers 30 and/or P2P device communities 40, as shown in the dashed lines, to increase the number of objects to be searched or the searching speed.

In one embodiment, the P2P devices 41~46 are respectively provided with the control units 415, 425, 435, 445, and 465 and the file data 411, 421, 431, 41, 451, and 461. The file data 411~461 respectively include a content data 4111~4611. The control units 415~465 control and configure the file data 411~461 and the content data 4111~4611 of the P2P devices 41~46 as an open state or a hidden state. If configured as an open state, the search engine 31 is allowed to create the indexed data 4113~4613 to the content data 4116~4611 of the P2P devices 41~46, and the online server 20 is allowed to provide the link data 49 of the P2P devices 41~46 to the user's devices 51~56; if configured as a hidden state, the search engine 31 is not allowed to create the indexed data 4113~4612 to the content data 4116~4611 of the P2P devices 41~46, and the online server 20 is not allowed to provide the link data 49 of the P2P devices 41~46 to the user's devices 51~56.

In one embodiment, the user-charge module 355 includes a user's identity data 3551 for recording the identity or access permission, for example, the registered user, the unregistered user, the user who pays for the service, or the user who uses the service free of charge, of the user's devices 51~56. The user-charge module 355 also records a charge-mode data 3553 allowing the user's devices 51~56 to select the payment plan which may be, for example, a monthly installment payment mode or pre-payment mode, where the pre-payment mode may be, for example, a down payment as the first installment and redeposit after no balance.

The user-charge module 355 also records a payment confirmation data 3555 which may be, for example, an SSL-based payment confirmation cooperating with a bank. The user-charge module 355 may be in communication with a bank to perform the payment checking: if the payment from the user's devices 51~56 has been confirmed, the user's device unit 35 allows the user's devices 51~56 to use the services; on the contrary, if the payment has not gone through, the user-charge module 355 provides the error messages to the user's devices 51~56 and requests payment confirmation before providing services. The user's devices 51~56 may communicate with the user-charge module 355 to perform online payment process through an application program or an exclusive webpage. Alternatively, the user-charge module 355 may record the link data 49 selected by the user's devices or the downloaded file data 411~461 and compute a charging (plan) data 3557 based on the amount of data transmission, the transmission bandwidth and/or the harddisk space being used. For example, the higher amount of data transmission, the higher the transmission bandwidth and the larger the harddisk space being used, and thus the higher the charge to the user's devices. The user's device management unit 35 may stop providing the file data when the amount of the recorded data has exceeded the predetermined baseline for the charge-mode data 3553.

Figure 4:
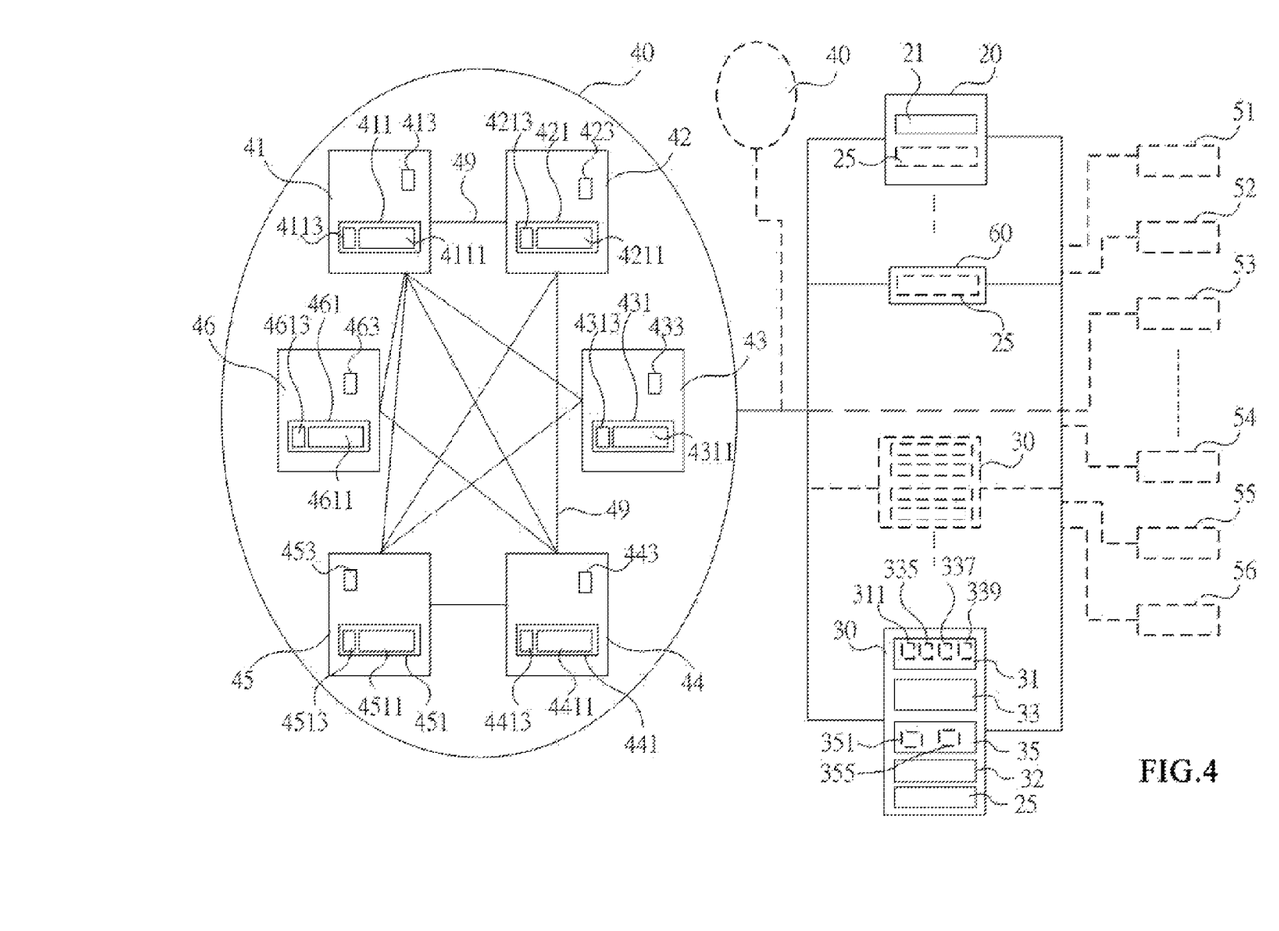
FIG. 4 is a schematic view of a searching system for a P2P device community and the P2P devices in accordance with another embodiment of the present disclosure.

Moreover, referring to FIG. 4, there is shown a schematic view of a searching system for a P2P device community and the P2P devices in accordance with another embodiment of the present disclosure. This embodiment differs from the embodiment shown in FIG. 3 in that the weight look-up table 25 may be provided in the online server 20, the content management server 30, and/or an independent storage device 60.

Figure 5:
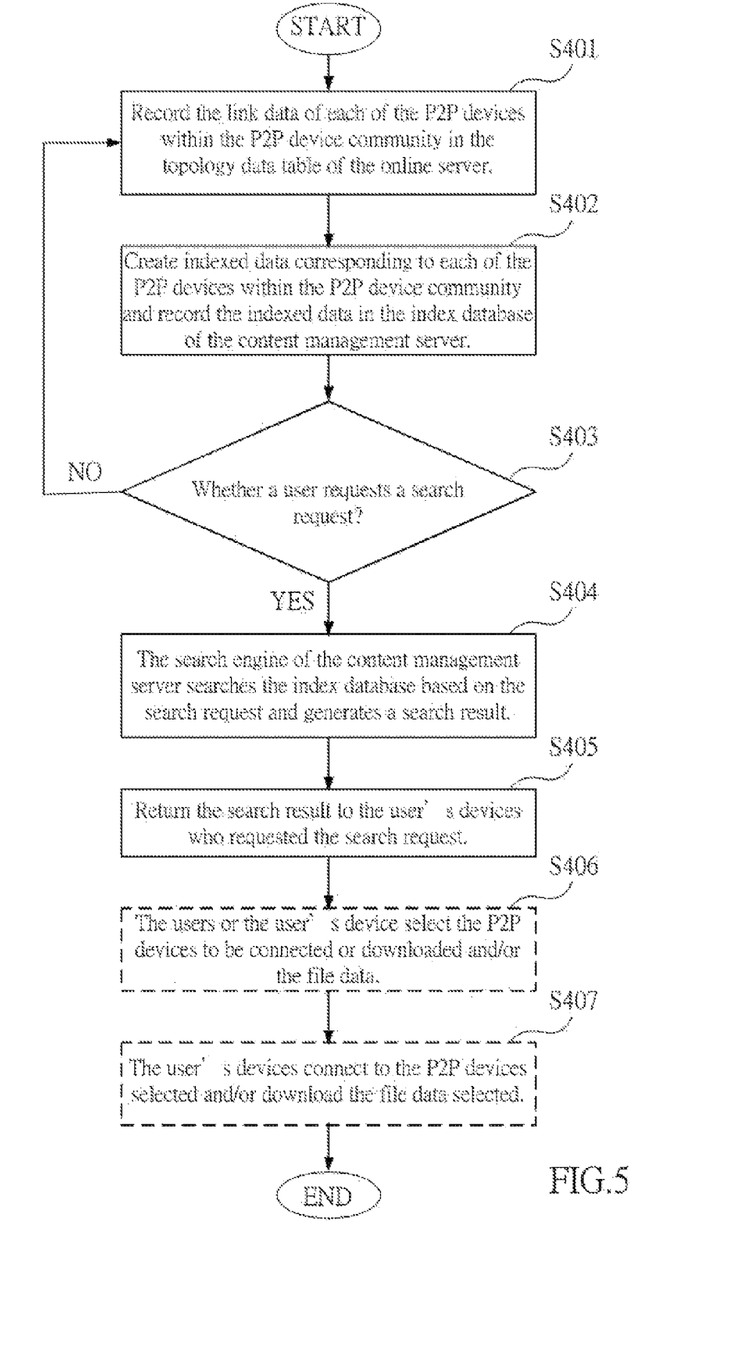
FIG. 5 is a flowchart of the searching method for a P2P device community in accordance with an embodiment of the present disclosure.

Referring to FIG. 5, there is shown a flowchart of the searching method for a P2P device community in accordance with an embodiment of the present disclosure. With reference to FIG. 3, the searching method of the present disclosure is applicable to a searching system of a P2P device community 40, and the searching system is provided with multiple P2P devices 41-46, an online server 20, and a content management server 30. The searching method includes the following steps. First, record the link data 49 of each of the P2P devices 41~46 within the P2P device community 40 in the topology data table 21 of the online server 20, as shown in step S401. Next, as shown in step S402, create indexed data 4113~4613 corresponding to each of the P2P devices 41~46 within the P2P device community 40 and record the indexed data 4113~4613 in the index database 33 of the content management server 30. As shown in step S403, determine whether a user requests a search request 351 to the user's device management unit 35 of the content management server 30 from any of the user's devices 51~56? If no, then go back to the step S401; otherwise, if yes, then proceed to step S404. In the step S404, the search engine 31 of the content management server 30 searches the index database 33 based on the search request 351 and generates a search result 311. As shown in step S405, the content management server 30 returns the search result 311 to the user's devices 51~56 who requested the search request 351.

In one embodiment, the search method further includes the following steps. In step S406, the users or the user's device 51~56 select the P2P devices 41~46 to be connected or downloaded and/or the file data 411~461, and the online server 20 provides the link data 49 of each of the P2P devices 41~46 based on the search result 311. In step S407, the user's devices 51~56 connect to the P2P devices 41~46 selected and/or download the file data 411~461.

Figure 6:
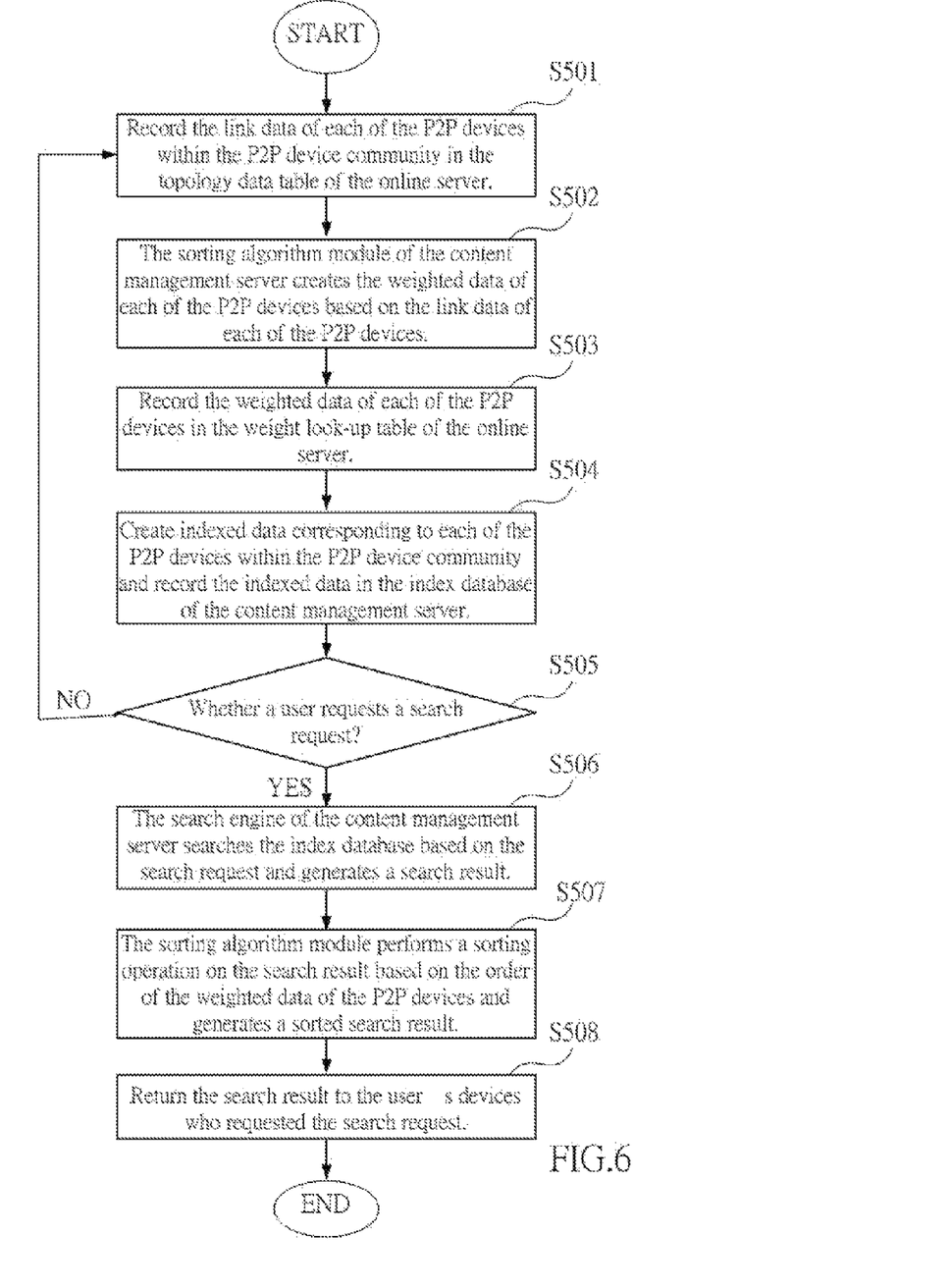
FIG. 6 is a flowchart of the searching method for a P2P device community in accordance with another embodiment of the present disclosure.

Referring to FIG. 6 with reference to FIG. 3, there is shown a flowchart of the searching method for a P2P device community in accordance with another embodiment of the present disclosure. The steps S501, S504, S505, S506, and S508 of this embodiment are identical to the steps S401, S402, S403, S404, and S405 shown in FIG. 5. In step S501, record the link data 49 of each of the P2P devices 41~46 within the P2P device community 40 in the topology data table 21 of the online server 20. In step S502, the sorting algorithm module 32 of the content management server 30 creates the weighted data 413~463 of each of the P2P devices 41~46 based on the link data 49 of each of the P2P devices 41~46. In step S503, record the weighted data 413~463 of each of the P2P devices 41~46 in the weight look-up table 25 of the online server 20. In step S504, the search engine 31 of the content management server 30 creates the indexed data 4113~4613 corresponding to the content data 4111~4611 of each of the P2P devices 41~46 within the P2P device community 40 and record the indexed data 4113~4613 in the index database 33 of the content management server 30.

In step S505, determine whether a user requests a search request 351 to the user's device management unit 35 of the content management server 30 from any of the user's devices 51~56? If no, then go back to the step S501; otherwise, if yes, then proceed to step S506. In the step S506, the search engine 31 of the content management server 30 searches the index database 33 based on the search request 351 and generates a search result 311. As shown in step S507, the sorting algorithm module 32 performs a sorting operation on the search result 311 based on the order of the weighted data 413~461 of the P2P devices 41~46 and generates a sorted search result 335. Next, return the sorted search result 335 to the user's device 51~56 who requested the search request 351, as shown in step S508.

In one embodiment, the steps S406 and S407 shown in FIG. 5 may be performed after the step S508 without further description.

Figure 7:
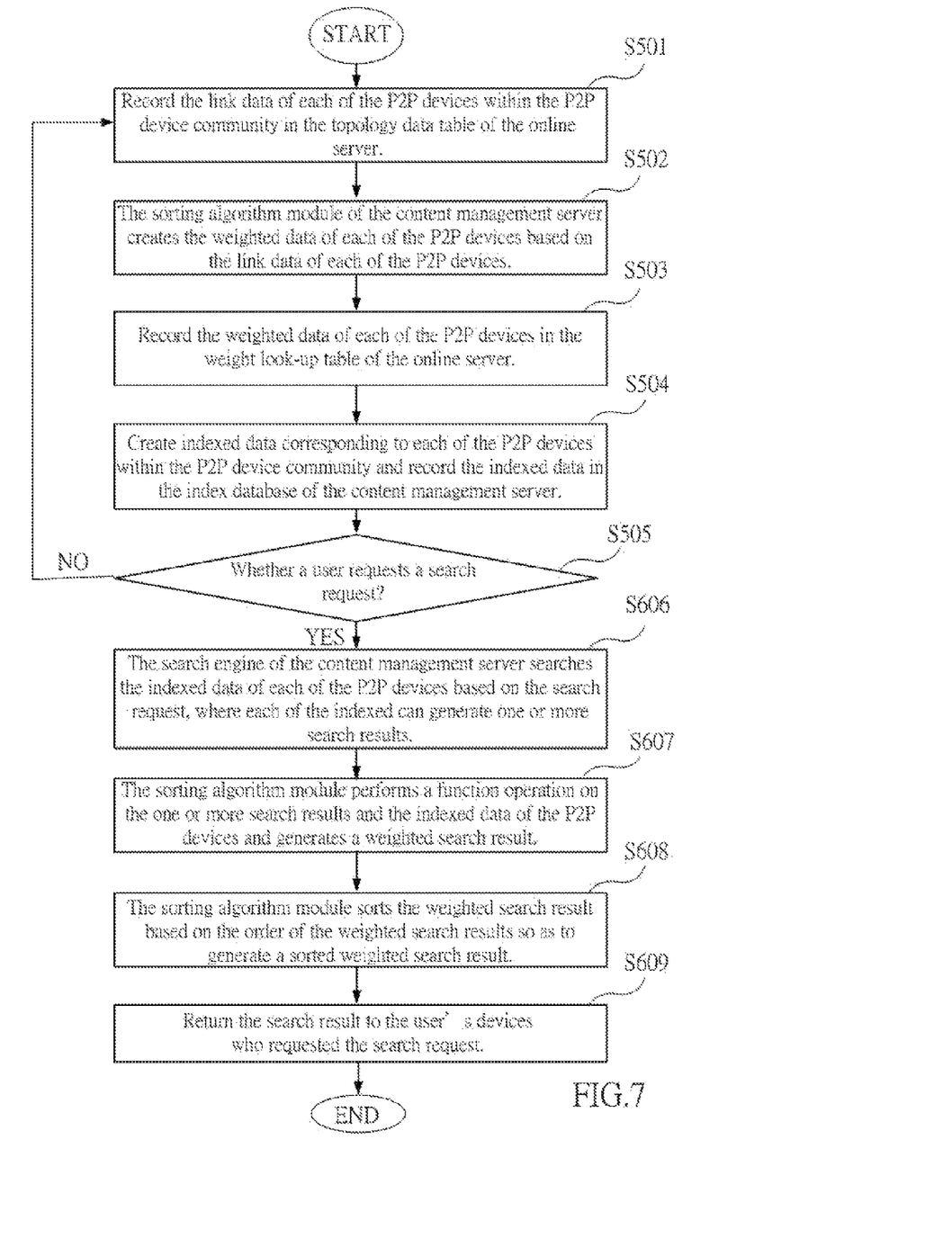
FIG. 7 is a flowchart of the searching method for a P2P device community in accordance with another embodiment of the present disclosure.

Referring to FIG. 7, there is shown a flowchart of the searching method for a P2P device community in accordance with another embodiment of the present disclosure. The steps S501~S505 of this embodiment are identical to that of the abovementioned embodiment shown in FIG. 6, but steps S606~S609 are different. In the step S606, the search engine 31 of the content management server 30 searches the indexed data 4113~4613 of each of the P2P devices 41~46 based on the search request 351, where each of the indexed data 4113~4613 can generate one or more search results 311. In the step S607, the sorting algorithm module 32 performs a function operation on the one or more search results 311 and the weighted data 413~463 of the P2P devices 41~46 and generates a weighted search result 337, where the function operation includes but not limited to a multiplication, an addition, a geometric progression, a PageRank, an HITS and/or a TrustRank. In the step S608, the sorting algorithm module 32 sorts the weighted search result 337 based on the order of the weighted search results so as to generate a weighted and sorted search result 339. Next, as shown in the step S609, the sorting algorithm module 32 returns the weighted and sorted search result 339 to the user's devices 51~56 who requested the search request 351.

In one embodiment, the content management server 30 confirms the identity of the user's devices 51~56 who requested the search request 351 and/or provides the search result 311 only after confirming the payment is completed, or the online server 20 provides the link data 49 of at least one P2P devices 41~46 to the user's devices 51~56. The payment confirmation process is shown in FIG. 8.

Figure 8:
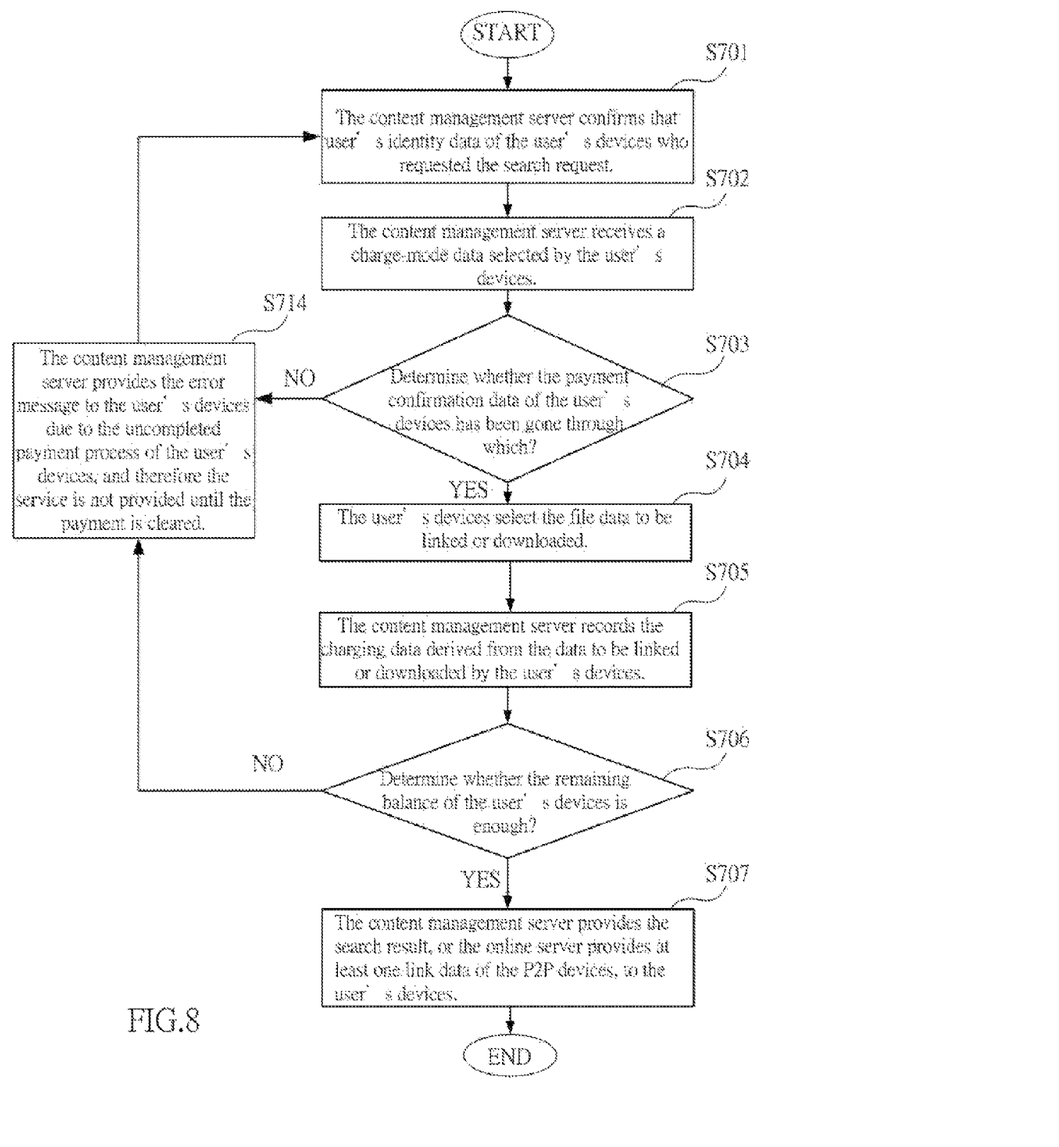
FIG. 8 is a flowchart of payment confirmation of the searching method for a P2P device community in accordance with the present disclosure.

Referring to FIG. 8, there is shown a flowchart of payment confirmation of the searching method for a P2P device community in accordance with the present disclosure. The searching system and the P2P devices of this embodiment can be referred to FIG. 3. In step S701, the content management server 30 confirms that user's identity data 3551 of the user's devices 51~56 who requested the search request 351, where the user's identity data 3551 may be one of, for example, the registered user, the unregistered user, the user who pays for the services, or the user who uses the services free of charge. Next, in step S702, the content management server 30 receives a charge-mode data 3553 selected by the user's devices 51~56, where the charge-mode data 3553 may be, for example, monthly installment payment mode or pre-payment mode.

In step S703, determine whether the payment confirmation data 3555 of the user's devices 51~56 has been gone through which, for example, can be confirmed by cooperating with a bank through SSL-based data transmission, and if yes, then proceed to step S704; if no, then proceed to step S714. In the step S714, the content management server 30 provides the error message to the user's devices 51~56 due to the uncompleted payment process of the user's devices 51~56, and therefore the service is not provided until the payment is cleared. In the step S704, the payment process is completed by the user's devices 51~56, and therefore the user's devices 51~56 can select the file data 411~461 to be linked or downloaded.

In step S705, the content management server 30 computes a usage charge (charging data 3557) based on the amount of data transmission, transmission bandwidth, and/or the hard-disk space being used required to download the file data 411~461 selected by the user's devices 51~56, and the content management server 30 records the charging data 3557 derived from the data to be linked or downloaded by the user's devices 51~56.

In step S706, determine whether the remaining balance of the user's devices 51~56 is enough? If yes, then proceed to step S707; if not, then proceed to step S714. In the step S714, the content management server 30 provides error message to the user's devices 51~56 due to the uncompleted payment process of the user's devices 51~56, and therefore the service is not provided until the payment is cleared. In the step S707, the content management server 30 provides the search result 311, or the online server 20 provides at least one link data 49 of the P2P devices 41~46, to the user's devices 51~56.

The present disclosure, as discussed herein, is industrially applicable, novel, and of significant value in technology development. It is to be understood; however, that this disclosure is not limited to the embodiments set forth and illustrated hereinabove, but encompasses any and all variations falling within the spirit and scope of this disclosure as defined by the appended claims and their equivalents.

What is claimed is:

1. A searching system for a P2P (peer-to-peer) device community, for receiving a search request sent from at least one user's device, the searching system comprising:
    at least one P2P device community, wherein each the P2P device community includes at least one P2P device, wherein each the P2P device respectively comprises at least one file data, and each the file data comprises a content data and an indexed data;
    at least one online server connecting to the P2P device community, each the online server includes a topology data table, the topology data table being recorded with a link data between each of the P2P devices of the P2P device community; and
    at least one content management server connecting to the P2P device community and the online server respectively, each the content management server includes a search engine, an index database, and a user's device management unit, wherein the index database records the indexed data of each the P2P device of the P2P device community, the user's device management unit receives the search request sent from the user's device, the search engine searches the index database to generate a search result based on the search request and then returning the search result to the user's device, wherein the user's device obtains the link data of the P2P device within the P2P device community according to the topology data table of the online server and the search result.

2. The searching system of claim 1, wherein each the P2P device includes a weighted data, and the content management server is provided with a sorting algorithm module creating the weighted data based on the link data associated with the P2P device, the search result being sorted by the order of the weighted data of the P2P device so as to generate a sorted search result.

3. The searching system of claim 2, further comprising: a weight look-up table recorded with the weighted data of each the P2P device, wherein the weight look-up table is stored in the content management server, the online server, or a storage device.

4. The searching system of claim 2, wherein the sorting algorithm module performs a function operation based on the search result and the weighted data corresponding to the P2P device to generate a weighted search result, and the weighted search result is sorted by the order of the weighted search results so as to generate a weighted and sorted search result.

5. The searching system of claim 1, wherein the user's device management unit includes a user-charge module, and wherein after confirming that the user's device has been charged, the content management server provides the search result, or the online server provides at least one of the link data of the P2P device, to the user's device.

6. The searching system of claim 5, wherein the user-charge module receives a user's identity data, a charging data, a charging-mode data, or a payment confirmation data, all of which being sent from the user's device.

7. The searching system of claim 1, wherein the indexed data can be created by the P2P devices themselves, or the indexed data can be created by the content management server gathering from the P2P devices via a network gathering module.

8. The searching system of claim 1, wherein the user's device connects to the P2P device according to the link data and downloads the file data based on the link data.

9. The searching system of claim 1, wherein the user's device connects to the P2P device based on the link data.

10. A P2P device applicable to the searching system of claim 1, comprising:
a control unit controlling the file data being an open state or a hidden state.

11. A searching method for a P2P device community, applicable to a searching system for a P2P device community, the searching system includes at least one P2P device, an online server, and a content management server, the searching method comprising the steps of:
recording a link data of each the P2P device to generate a topology data table and storing the topology data table in the online server, wherein each the P2P devices respectively comprises at least one file data, and each the file data comprises a content data and an indexed data;
recording the indexed data of each the P2P device and storing the indexed data in an index database of the content management server;
receiving by the content management server a search request sent from a user's device and generating a search result by searching the index database based on the search request;
returning the search result to the user's device; and
obtaining the link data of the P2P device within the P2P device community by the user's device according to the topology data table of the online server and the search result.

12. The searching method of claim 11, further comprising the steps of:
creating a weighted data associated with each the P2P device by the content management unit based on the link data of the P2P devices;
performing a function operation based on the search result and the weighted data corresponding to the P2P device to generate a weighted search result; and
sorting the weighted search result based on the order of the weighted search results to generate a weighed and sorted search result.

13. The searching method of claim 12, further comprising the steps of:
recording the weighted data of the P2P devices to generate a weight look-up table; and
storing the weight look-up table in the content management server, the online server, or a storage device.

14. The searching method of claim 11, further comprising the steps of:
providing the search result by the content management server, or providing at least one link data of the P2P device by the online server, to the user's device by the content management server confirming that the user's device has been charged.

15. The searching method of claim 14, wherein the content management server confirming that the user's device has been charged comprises the steps of:
confirming a user's identity data of the user's device;
receiving a charge-mode data sent from the user's device;
confirming a payment confirmation data sent from the user's device; and
recording a pricing data required for connection or downloading requested by the user's device.

16. The searching method of claim 11, wherein the indexed data can be created by the P2P devices themselves, or the indexed data can be created by the content management server gathering from the P2P devices via a network gathering module.

17. The searching method of claim 11, further comprising the step of:
controlling a file data of each the P2P device being an open state or a hidden state.

18. The searching method of claim 17, further comprising the steps of:
connecting to the P2P device and downloading the file data by the user's device based on the link data.

19. The searching method of claim 11, further comprising the steps of:
connecting to the P2P device by the user's device based on the link data.

* * * * *